(12) United States Patent
O'Connor et al.

(10) Patent No.: US 6,397,386 B1
(45) Date of Patent: May 28, 2002

(54) DECIMATION METHOD FOR PROVIDING PIG WINDOWS

(75) Inventors: Daniel C. O'Connor, Beverly; Arthur Y. Ng, Waltham, both of MA (US)

(73) Assignee: Index Systems, Inc., Tortola, VI (US)

( * ) Notice: Subject to any disclaimer, the term of this patent is extended or adjusted under 35 U.S.C. 154(b) by 0 days.

(21) Appl. No.: 09/540,570

(22) Filed: Mar. 31, 2000

Related U.S. Application Data

(60) Provisional application No. 60/127,270, filed on Mar. 31, 1999.

(51) Int. Cl.[7] .......................... H04N 5/445; H04N 5/45; G06F 3/00; G06F 13/00
(52) U.S. Cl. ........................... 725/39; 725/43; 348/565
(58) Field of Search ................................. 348/563–565; 725/39, 43, 61; 345/721; 375/240.21

(56) References Cited

U.S. PATENT DOCUMENTS

| | | | |
|---|---|---|---|
| 4,779,135 A | * 10/1988 | Judd ........................... | 348/565 |
| 5,635,978 A | 6/1997 | Alten et al. ..................... | 348/7 |
| 5,715,515 A | 2/1998 | Akins, III et al. ........... | 455/4.1 |
| 5,737,028 A | 4/1998 | Bertram et al. ............. | 348/563 |
| 5,828,419 A | * 10/1998 | Bruette et al. ............... | 348/563 |
| 6,177,931 B1 | * 1/2001 | Alexander et al. .......... | 345/721 |
| 6,252,906 B1 | * 6/2001 | Canfield ................ | 375/240.21 |

FOREIGN PATENT DOCUMENTS

| | | | |
|---|---|---|---|
| WO | WO97/34413 | 9/1997 | |
| WO | WO97/34414 | 9/1997 | |
| WO | WO98/43419 | 10/1998 | |
| WO | WO 98/43419 | * 10/1998 | ............ H04N/5/45 |
| WO | WO 99/04561 | 1/1999 | |
| WO | WO 99/11061 | 3/1999 | |
| WO | WO99/38322 | 7/1999 | |

OTHER PUBLICATIONS

International Preliminary Examination Report dated May 21, 2001.
International Search Report, PCT/US 00/08591, (5 pages).

* cited by examiner

*Primary Examiner*—Andrew Faile
*Assistant Examiner*—Hai V. Tran
(74) *Attorney, Agent, or Firm*—Christie, Parker & Hale, LLP

(57) ABSTRACT

A decimation system and method for providing video data to a PIG window in an EPG environment. In one embodiment, the system includes an EPG system having a picture in guide window, a tuner to generate a video signal, a decoder coupled to the tuner to receive the video signal and generate pixels based on the received signal, a PIG generator coupled to the decoder that performs a real time weighted averaging to select a subset of the pixels; and a display generator to display the subset of the pixels in the PIG window on a monitor.

6 Claims, 3 Drawing Sheets

DECIMATION METHOD FOR PROVIDING PIG WINDOWS

RELATED APPLICATIONS

This application claims priority of U.S. Provisional Application No. 60/127,270, filed on Mar. 31, 1999, the disclosure of which is incorporated fully herein by reference.

BACKGROUND OF THE INVENTION

The present invention relates generally to graphical/video display systems and methods, and in particular to methods and systems for optimizing graphical/video displays, such as Picture-In-Guide ("PIG") windows and their memory requirements.

Generally, televisions and television systems, such as computers to operate as televisions, provide information to a user through a display. One example is an electronic program guide ("EPG"). An EPG provides a user or television viewer with updatable television schedule information in the form of an on-screen graphical display. The EPG may provide scheduling information for current and future broadcast programs as well as summaries of television program content for a particular program. The EPG may also provide one or more regions (windows) for previewing different television programs simultaneous with the displayed schedule information or with broadcast of the television program. Often the EPG divides the display into multiple portions or regions of varying size and resolution to provide multiple types of information.

Conventionally, most television systems do not optimally use their available resources, such as memory space or processor bandwidth to effectively and efficiently provide information through the PIG window to a user. Therefore, there is a need for a method and system for providing a real-time and high quality video in a smaller PIG screen with minimum memory requirement.

SUMMARY OF THE INVENTION

The present invention is a decimation system and method for providing video data to a PIG window. One video pixel for every several video pixels is output, in real time, for the PIG window based on some (pixel) averaging algorithms. In one embodiment, only the two previous pixel lines are buffered, eliminating the need for buffering of the entire frame. This system produces real-time and high quality video in a smaller PIG screen with minimum memory requirement.

In one embodiment, the system of the present invention includes an EPG system having a picture in guide window, a tuner to generate a video signal, a decoder coupled to the tuner to receive the video signal and generate pixels based on the received signal, a PIG generator coupled to the decoder that performs a real time weighted averaging to select a subset of the pixels; and a display generator to display the subset of the pixels in the PIG window on a monitor.

Many of the features of this invention will be more readily appreciated as the same becomes better understood by reference to the following detailed description and considered in connection with the accompanying drawings.

DETAIL DESCRIPTION

This invention relates to a decimation system and method for providing video data to a PIG window, preferably in an EPG. In one embodiment of the present invention, one video pixel for every several video pixels is output for the PIG window based on some (pixel) averaging algorithms. The earliest versions of on-screen EPGs provided for the storage of program schedule information in an electronic memory connected to the television receiver and generally provided for the on-screen formatting and display of the program schedule information on the television screen. The early EPGs typically overlaid the television programming. Later EPGs provided PIG display of the television program simultaneous with the display of the EPG. In PIG format, the moving, real time images of one television channel are displayed on the background of the EPG in a PIG window overlaid on a small area of the background.

The PIG display, according to one embodiment of the present invention, includes a real-time video image of a tuned television program displayed in a small window inset in a larger graphic guide. The PIG display provides many options to the viewer. The viewer may continue to view the television program s/he was watching before entering the guide while browsing through the television scheduling information in the guide. Alternatively, the program displayed in the PIG window may change for corresponding to a selected channel in the guide as the viewer cursors through program listings in the guide. The viewer may also pull up the PIG display to find out more information about the program s/he is currently watching, such as start/stop time or a program synopsis, while continuing to view the program in the inset PIG window.

Figure 1:
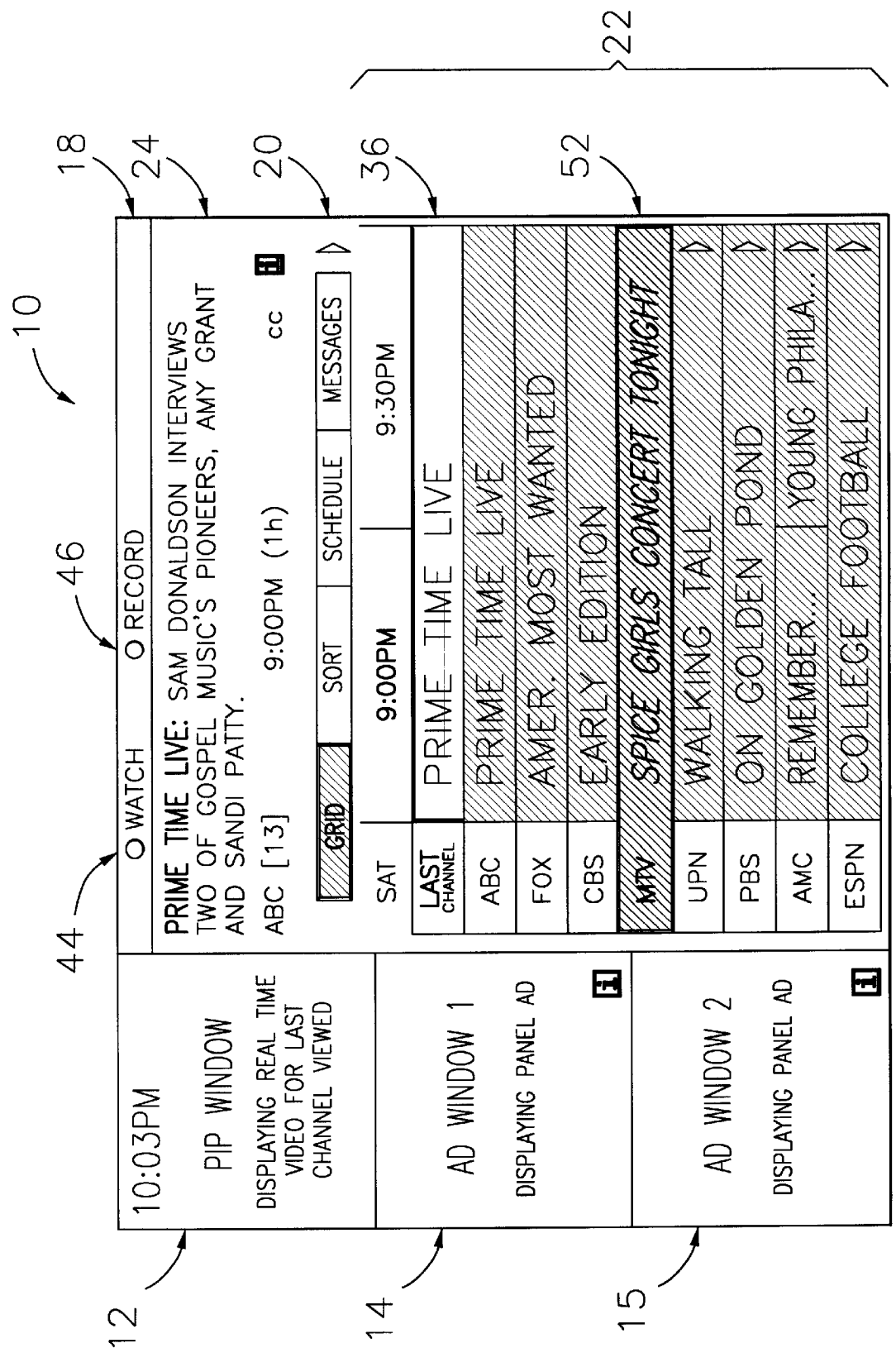
FIG. 1 is an exemplary PIG display of an EPG according to one embodiment of the present invention.

FIG. 1 illustrates a PIG display 10 of an electronic program guide (EPG) including a grid portion 22 and a picture window 12. The picture window 12, hereafter referred to as the PIG window, contains a video image of the television program displayed in the full-screen video display, but in reduced size, generally reduced by a factor of three in both width and height, i.e., ⅑ the size of the screen. However, other reduction factors are also possible and are within the scope of the invention. Below window 12 are Panel Ad Windows 14, and 16 ("Ad Windows"). Windows 12, 14, and 16 each typically occupy about ⅑ of the total screen area. Another possible screen for display in a PIG system is a full-screen graphics display. The PIG window may also be used to display advertisement including text and video previews of goods, services, or television programs.

The grid portion 22 of the PIG display 10 takes up a majority of the screen. The grid portion generally includes text, icons, and background graphics of several different colors. The graphics may include highlighting of text or sections of the screen. In an EPG system, the viewer can generally navigate through different guides without changing the television program displayed in the PIG window 12. The remainder of the screen area is typically occupied (moving from top to bottom of the screen) by an action key bar 18, a navigation bar 20, and an information box 24 (the "detailed information area").

In one embodiment of the present invention, when the viewer places a cursor on a different channel designation 52 or program title in the grid portion, the system automatically tunes the associated tuner to the selected channel and displays the program broadcast on that channel in the PIG window 12.

According to one embodiment of the invention, the components necessary to generate a PIG display 10 are provided on a single chip to be incorporated into televisions, PC/TVs, VCRs, stand-alone units, satellite receivers, or the like. By providing all the components on a single chip, the overall package size can be reduced as well as the overall gate count and bus interface size of that chip.

Figure 2:
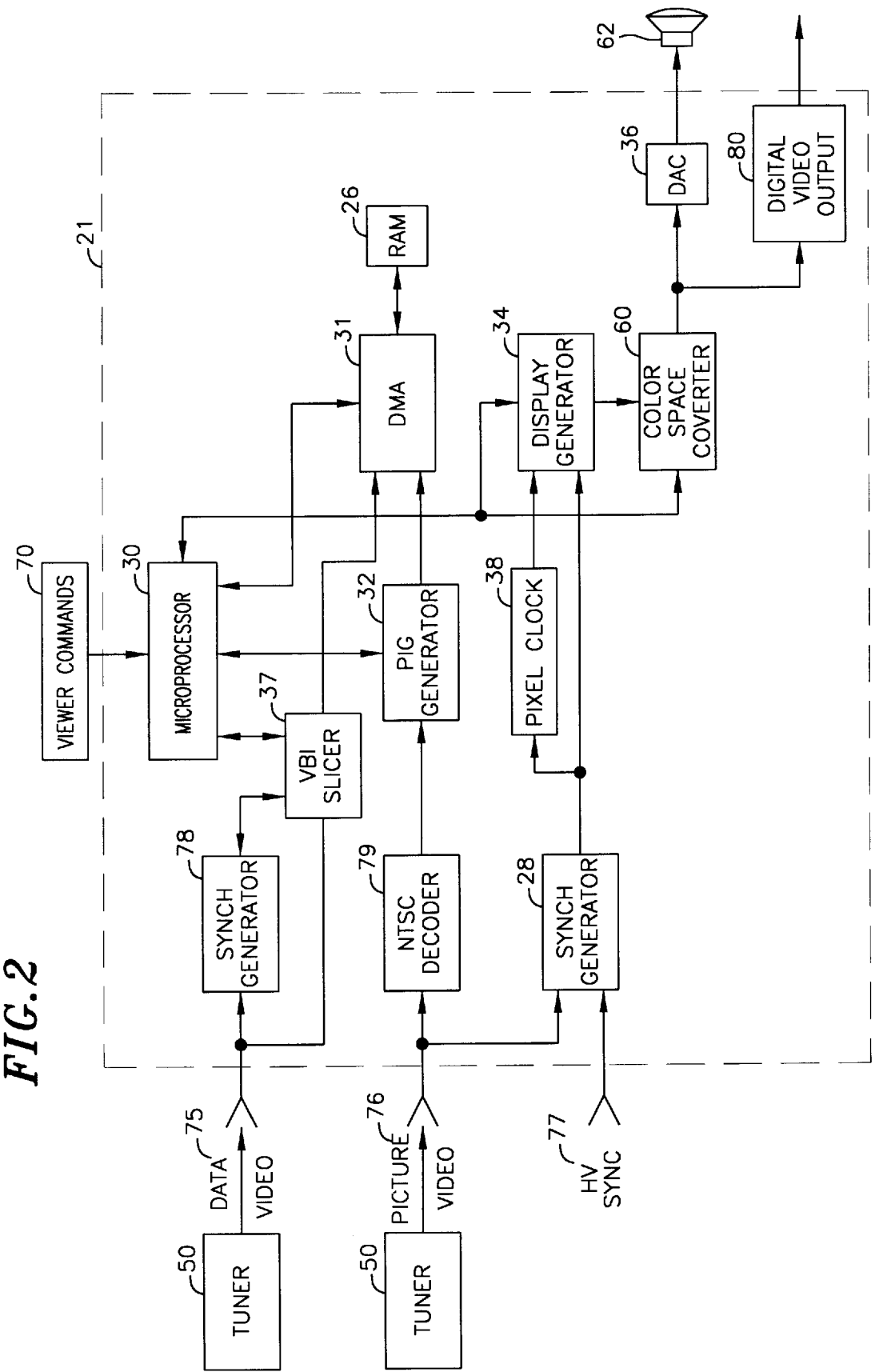
FIG. 2 is a simplified exemplary block diagram of a television system that includes a decimation system according to one embodiment of the present invention.

FIG. 2 is a block diagram of the components of one embodiment of the invention provided on a single chip 21. These include a microprocessor 30, a memory controller or direct memory access (DMA) device 31, synchronization regenerating (synch) circuitry 28 and 78, VBI slicer 37, NTSC decoder 79, PIG generator 32, pixel clock generator 38, display generator 34, color space converter 60, digital-to-analog conversion (DAC) 36, digital video output 80.

The microprocessor 30 configures and coordinates the activities of all of the other components on the chip 21 via two-way communication paths without participating in any data movement operations, such as the VBI slicer 37 writing EPG data to memory via the DMA engine 31. The microprocessor 30 accesses RAM 26 using the DMA engine 31 as a proxy by providing address information and either providing data (in the case of a write) or receiving data (in the case of a read).

Preferably, there is only one RAM, although this invention will work with any number of RAMs. This RAM and the microprocessor 30 may be part of the chip 21 or may be external. The decision of internal versus external RAM and/or microprocessor is driven by economic and technological constraints. RAM 26 is accessed by four different components: the microprocessor 30, the PIG generator 32, the VBI slicer 37, and the display generator 34. This places a high access load on the RAM as all four components may vie for access to the RAM simultaneously. If all access requests cannot be satisfied simultaneously (either by using a RAM that can access several bytes per cycle or using several RAMs or using a RAM whose cycle time is several times faster than the chip cycle time), a multiplexing device is necessary to resolve the arbitration between the components. Accordingly, the microprocessor 30, PIG generator 32, VBI slicer 37, and the display generator 34 each access the RAM 26 through the DMA 31. The DMA is a multiplexing and arbitrating circuit that facilitates the sharing of the RAM 26 by switching access between the four components in turn. The DMA may include buffer memory to temporarily store data input from out-of-turn components between access cycles. The DMA 31 stores text and video data in the correct addresses in the RAM 26 and then retrieves the appropriate data from a selected address from the RAM 26 when needed.

In one embodiment, the system can receive two independent video signals from two independent tuners 50. In a unit with two tuners, this allows chip 21 to collect data from one channel while the user is in the guide viewing a different channel. Other embodiments with more than two tuners for receiving more than two video signals to display in a plurality of PIG windows are also possible. In a unit with one tuner, both video inputs would be connected to the one tuner.

The picture video input 76 from one of the tuners 50 is connected to the NTSC decoder 79. The NTSC decoder takes an analog input and outputs digital pixels either R, G, B or Y, U, V in sufficient resolution for the desired PIG picture quality.

To implement a low-cost PIG device for use in a PIG system, the incoming video data is decimated before the video data is stored in a memory device. Thus the resulting PIG has a limited resolution. In one embodiment, a weighted averaging algorithm is used to select one pixel out of nine pixels (decimation by 9). The incoming digitized video data is buffered in a low-cost memory, such as a shift register, to carry out the averaging algorithm.

For example, for an immediate neighbor averaging, the adjacent pixels in a sliding window (nine pixels) for the current line, the two previous lines are stored in the buffer (shift register) and the desired averaging function is performed on them to obtain one weighted pixel for each nine pixels. The resulting pixel is then converted to video signal for display in a PIG window, or it is stored in memory to be used for PIG window display. For a nine pixel sliding window, only two previous lines of video data need to be buffered.

Figure 3:
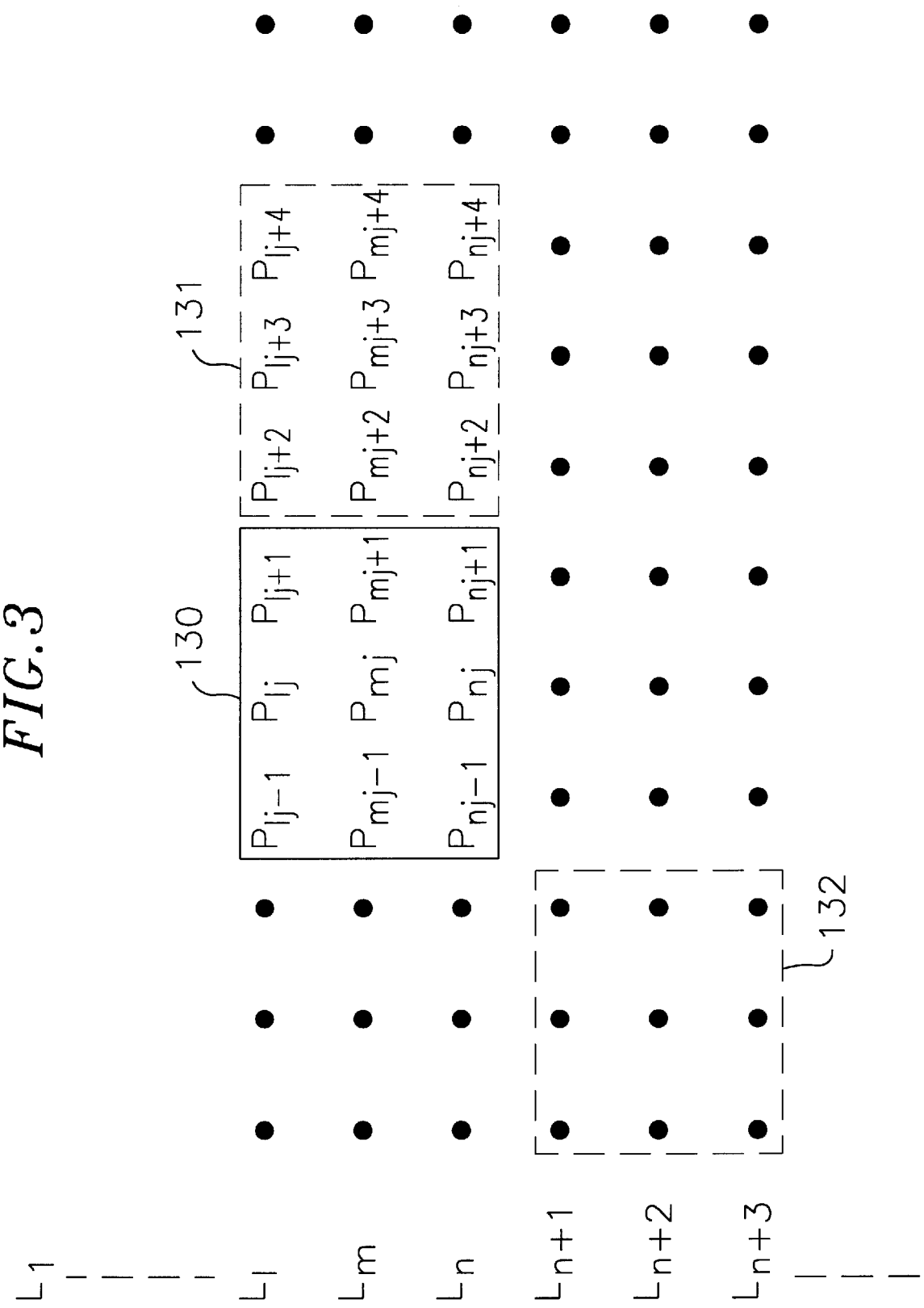
FIG. 3 is an exemplary averaging window for three pixel lines according to one embodiment of the present invention.

Referring now to FIG. 3, sliding window 130 contains nine pixels. The two previous lines 1 and m are buffered. When pixel Pnj+1 of the new line n arrives, the averaging algorithm is performed, and the resulting (weighted) pixel is output in real time. When the next pixel Pnj+2 arrives, it is buffered but, the averaging algorithm is not performed until Pnj+3 and Pnj+4 arrive. As Pnj+4 arrives, the sliding window shifts to the right by three pixels to position 131. The averaging algorithm is performed and again, the next (weighted) pixel is output in real time. When the end of line is reached, the sliding window moves down by three pixels to the beginning of lines Ln+1, Ln+2, and Ln+3. No decimation is carried out until lines Ln+1 and Ln+2 are buffered. Once lines Ln+1 and Ln+2 are buffered, the decimation continues as indicated above.

The following illustrates an example for a polynomial weighted averaging algorithm:

| Field | Line | Pixels | | | | | | | | |
|---|---|---|---|---|---|---|---|---|---|---|
| 1 | 1 | 1 | 2 | 3 | 4 | 5 | 6 | 7 | 8 | 9 |
| 2 | 1 | 1 | 2 | 3 | 4 | 5 | 6 | 7 | 8 | 9 |
| 1 | 2 | 1 | 2 | 3 | 4 | 5 | 6 | 7 | 8 | 9 |
| 2 | 2 | 1 | 2 | 3 | 4 | 5 | 6 | 7 | 8 | 9 |
| 1 | 3 | 1 | 2 | 3 | 4 | 5 | 6 | 7 | 8 | 9 |
| 2 | 3 | 1 | 2 | 3 | 4 | 5 | 6 | 7 | 8 | 9 |

As field 1, line 1 is received, pixels 1, 2, and 3 are summed together and stored, similarly for 4, 5, and 6 and 7, 8, and 9. The same procedure is used for line 3. The procedure is repeated for every line in field 1. When field 2 is received, field 2, line 1 is added to field 1, line 1 and field 1, line 3. Field 2, line 2 and field 2, line 3 are added to field 1, line 3, etc.

Note: pixel locations are marked (field-line-pixel). A field is assumed to have lines 1–240 inclusive active video lines. Each line is assumed to have 640 pixels.

The locations in memory after the first field is received would be:

memory[1]=(1-1-1)+2*(1-1-2)+(1-1-3)+(1-2-1)+2*(1-2-2)+ 1-2-3)

memory[2]=(1-1-4)+2*(1-1-5)+(1-1-6)+(1-2-7)+2*(1-2-8)+ (1-2-9) . . .

memory[213]=(1-1-637)+2*(1-1-638)+(1-1-639)+(1-2-637)+2*(1-2-638)+(1-2-639)

memory[214]=2*(1-3-1)+4*(1-3-2)+2*(1-3-3)

memory[215]=2*(1-3-4)+4*(1-3-5)+2*(1-3-6) . . .

memory[426]=2*(1-3-637)+4*(1-3-638)+2*(1-3-639) . . .

memory[33868]=2*(1-240-1)+4*(1-240-2)+2*(1-240-3) . . .

memory[34080]=2*(1-240-637)+4*(1-240-638)+2*(1-240-639)

As the second field is received, the following pixels are output:

pixel[1]={memory[1]+2*(2-1-1)+4*(2-1-2)+2*(2-1-3)}/16
pixel[2]={memory[2]+2*(2-1-4)+4*(2-1-5)+2*(2-1-6)}/16 . . .
pixel[213]={memory[213]+2*(2-1-637)+4*(2-1-638)+2*(2-1-639)}/16
pixel[214]={memory[214]+(2-2-1)+2*(2-2-2)+(2-2-3)+(2-3-1)+2*(2-3-2)+(2-3-3)}/16 . . .

The memory is updated with terms involving field 2 only.
memory[1]=2*(2-1-1)+4*(2-1-2)+2*(2-1-3)
memory[2]=2*(2-1-4)+4*(2-1-5)+2*(2-1-6) . . .
memory[213]=2*(2-1-637)+4*(2-1-638)+2*(2-1-639)
memory[214]=(2-2-1)+2*(2-2-2)+(2-2-3)+(2-3-1)+2*(2-3-2)+(2-3-3) . . .

As the next field 1 is received the output pixels are:
pixel[1]={memory[1]+(1-1-1)+2*(1-1-2)+(1-1-3)+(1-2-1)+2*(1-2-2)+(1-2-3)}/16
and so on. . .

This algorithm converts every nine pixels into one pixel using polynomial weighted averaging with binary coefficients, without having to store the entire frames. As a result, a PIG window of a one-ninth the size of the original display window is generated. The picture is de-interlaced before the averaging and then re-interlaced after the averaging is completed.

Assuming the binary coefficients for the nine-pixel window are a, b, c,
d, e, f,
g, h, i, in one embodiment, the transfer function performed by the algorithm is: $(a+2b+c+2d+4e+2f+g+2h+i)/16$. The averaging algorithm is performed in real time before the video data is stored. A minimum amount of memory is needed because only the two previous lines of each field, sufficient for carrying out the algorithm, are stored. The algorithm also counter balances the motion effects by assigning a heavier weight to the center pixel (i.e., 4e).

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. An electronic program guide (EPG) system including a picture in guide (PIG) window comprising:
   a monitor having a display screen;
   a tuner to generate a video signal;
   a decoder coupled to the tuner to receive the video signal and generate pixels based on the received signal;
   a PIG generator coupled to the decoder that performs a real time weighted averaging to generate a subset of the pixels as a line of pixels is generated by the decoder;
   a memory to buffer the generated pixels; and
   a display generator to display the subset of the pixels in the PIG window on the display screen, wherein the memory buffers 3 adjacent pixels in a 3×3 sliding window for the current line and the previous two lines, and the PIG generator performs the real time weighted averaging to select one pixel out of the nine pixels from the sliding window.

2. The EPG system of claim 1, wherein the PIG generator in real time selects one pixel out of the nine pixels based on a transfer function of $(a+2b+c+2d+4e+2f+g+2h+i)/16$, wherein a, b, c, d, e, f, g, h, and i are binary coefficients for the respective pixels in the 3×3 sliding window.

3. A television system for receiving a video signal, comprising:
   a monitor having a display screen;
   a plurality of tuners to generate a plurality of video signals that carry video programs and data related to the video programs;
   a memory to buffer pixels corresponding to a subset of the generated video signals;
   a PIG chip coupled to the monitor and the tuners to display a first image in a PIG window on the screen based on a video signal generated by one of the plurality of tuners, wherein the PIG chip performs a real time weighted averaging to select one pixel out of nine pixels from the video signal to display the respective program in the PIG window on the screen; and
   means for coupling the program related data to the PIG chip so as to display the data in a second area on the screen contemporaneously with the program displayed in the PIG window, wherein the memory buffers 3 adjacent pixels in a 3×3 sliding window for the current line and the previous two lines of the video signal generated by one of the plurality of tuners, and the PIG chip performs the real time weighted averaging to select one pixel out of the nine pixels in the sliding window.

4. The EPG system of claim 3, wherein the PIG chip in real time selects one pixel out of the nine pixels based on a transfer function of $(a+2b+c+2d+4e+2f+g+2h+i)/16$, wherein a, b, c, d, e, f, g, h, and i are binary coefficients for the respective pixels in the 3×3 sliding window.

5. A method for providing video data to a picture in guide (PIG) window displayed on a monitor, the method comprising the steps of:
   receiving a video signal;
   generating pixels based on the received signal;
   performing a real time weighted averaging to generate a subset of the pixels as a line of pixels is generated by the decoder;
   buffering the generated pixels; and
   displaying the subset of the pixels in the PIG window on the monitor, wherein the step of buffering comprises buffering 3 adjacent pixels in a 3×3 sliding window for the current line and the previous two lines, and the step of performing a real time weighted averaging comprises performing the real time weighted averaging for selecting one pixel out of the nine pixels in the sliding window.

6. The method of claim 5, wherein the step of performing a real time weighted averaging comprises selecting one pixel out of the nine pixels based on a transfer function of $(a+2b+c+2d+4e+2f+g+2h+i)/16$, wherein a, b, c, d, e, f, g, h, and i are binary coefficients for the respective pixels in the 3×3 sliding a window.

* * * * *

UNITED STATES PATENT AND TRADEMARK OFFICE
CERTIFICATE OF CORRECTION

PATENT NO. : 6,397,386 B1
DATED : May 28, 2002
INVENTOR(S) : Daniel C. O'Connor and Arthur Y. Ng It is certified that error appears in the above-identified patent and that said Letters Patent is hereby corrected as shown below:

<u>Title page,</u>
Item [75], Inventors should read:
-- Daniel C. O'Connor, Pasadena, CA (US),
ArthurY. Ng, Waltham, MA (US) --

<u>Column 6,</u>
Line 62, replace "sliding a window" with -- sliding window --.

Signed and Sealed this

Eighteenth Day of March, 2003

JAMES E. ROGAN
*Director of the United States Patent and Trademark Office*